(12) United States Patent
Kandaswami et al.

(10) Patent No.: US 7,989,009 B2
(45) Date of Patent: Aug. 2, 2011

(54) COMPOSITION AND METHOD FOR PROMOTING WEIGHT LOSS

(75) Inventors: Chithan Kandaswami, Lewisville, TX (US); Sidney Stohs, Frisco, TX (US); Christina Coyle, Dallas, TX (US)

(73) Assignee: Advocare International, L.P., Plano, TX (US)

(*) Notice: Subject to any disclaimer, the term of this patent is extended or adjusted under 35 U.S.C. 154(b) by 1521 days.

(21) Appl. No.: 11/345,272

(22) Filed: Feb. 2, 2006

(65) Prior Publication Data

US 2007/0178216 A1    Aug. 2, 2007

(51) Int. Cl.
*A61K 36/82* (2006.01)
*A61K 36/00* (2006.01)

(52) U.S. Cl. .......................... 424/729; 424/725

(58) Field of Classification Search ................ None
See application file for complete search history.

(56) References Cited

U.S. PATENT DOCUMENTS

| | | | |
|---|---|---|---|
| 4,871,718 A | 10/1989 | Carniglia | |
| 5,788,971 A | 8/1998 | Togasaki | |
| 6,159,476 A | 12/2000 | Djananov et al. | |
| 6,383,482 B1 | 5/2002 | Gorsek | |
| 6,565,847 B1 | 5/2003 | Gorsek | |
| 6,632,459 B2 | 10/2003 | Graus et al. | |
| 6,638,545 B1 | 10/2003 | Rombi | |
| 6,814,986 B1 | 11/2004 | Rombi | |
| 6,830,765 B2 | 12/2004 | Rombi | |
| 6,932,987 B1 | 8/2005 | Diaz et al. | |
| 2002/0054923 A1 | 5/2002 | Suzuki et al. | |
| 2002/0146472 A1 | 10/2002 | Chen et al. | |
| 2002/0192308 A1 | 12/2002 | Mamana | |
| 2003/0096025 A1 | 5/2003 | Uehara et al. | |
| 2003/0104081 A1 | 6/2003 | Rombi | |
| 2004/0001862 A1 | 1/2004 | Xiu | |
| 2004/0037788 A1 | 2/2004 | Barreca | |
| 2004/0077556 A1 | 4/2004 | Chinery | |
| 2005/0008712 A1 | 1/2005 | Bagchi et al. | |
| 2005/0084546 A1 | 4/2005 | Smith et al. | |
| 2005/0171034 A1* | 8/2005 | Halevie-Goldman | 514/28 |
| 2005/0249827 A1 | 11/2005 | Gardiner et al. | |

FOREIGN PATENT DOCUMENTS

| | | | |
|---|---|---|---|
| JP | 60-114153 | | 6/1985 |
| JP | 2002179586 A | * | 6/2002 |
| JP | 2003113026 A | * | 4/2003 |
| JP | 2004161644 A | * | 6/2004 |
| JP | 2005-229974 | | 9/2005 |

OTHER PUBLICATIONS

"Best Vitamins for Weight Reduction". Internet Archive Date: May 28, 2005 [retrieved from the Internet on: Sep. 15, 2010]. Retrieved from: <http://web.archive.org/web/20050528112947/http://www.annecollins.com/best-vitamins-for-weight-control.htm>.*

Muroyama et al. "Anti-obesity effects of a mixture of thiamin, arginine, caffeine, and citric acid in non-insulin dependent diabetic KK mice". J Nutr Sci Vitaminol (Tokyo). Feb. 2003;49(1):56-63.*

Product Description for Thermoshred, www.musclemaster.com, web page, http://www.musclemaster.com/content/s-product.asp?visitid=C426266488&detail=MT-155, Feb. 20, 2006.

Product Review for Lean Tea Complex, Optimum Nutrition, web page, http://www.1fast400.com/?products_id=900, Feb. 20, 2006.

Product Description for Thermo Dynamx, Nutrition Info, EAS, web page, http://register.eas.com/OA_HTML/ibeCCtpSctDspRte.jsp?section=11022&JServSessionldroot=3cbo0m2h91.pR9vq79y, Feb. 20, 2006.

Product Description for Power Burn, Unicity Science, web page, http://www.usa.makelifebetter.com/SYSTEMS/SCIENCE/SCIENCE_19596.HTML, Feb. 20, 2006.

Incledon, Fat-Loss Options, http://thomasincledon.com/FreeArticles/pdf/Fat%20Loss%20Supplements.pdf, 2004, Feb. 20, 2006.

Product Description for Thermogain, Manufactured by Muscletech, Web Page, http://www.buysupplements.com/index.php?main_page=product_info&manufactures_id=7&products_id=12308, Feb. 20, 2006.

Harada, et al., Effects of the Long-Term Ingestion of Tea Catechins on Energy Expenditure and Dietary Fat Oxidation.., Journal of Health Science, 51(2) 248-252, 2005.

Yang, et al., Effects of Tea Consumption on Nutrition and Health, J. Nutr. 130: 2409-2412 (2000) Amer. Society for Nutritional Sciences.

Dulloo, et al., Green tea and thermogenesis: interactions between catechin-polyphenols, caffeine and sympathetic activity, International Journal of Obesity, 2000 (24), 252-258.

Dulloo, et al., Efficacy of a green tea extract rich in catechin polyphenols and caffine.. , Am J Clin Nutr 1999; 70:1040-1045, Amer. Society for Clinical Nutrition.

Rumpler, et al., Oolong Tea Increases Metabolic Rate and Fat Oxidation in Men, J Nutr. 131: 2848-2852 (2001) Amer Society for Nutritional Sciences.

Yang, et al., Green, oolong and black tea extracts modulate lipid metabolism in hyperlipidemia rats.., The Journal of Nutritional Biochemistry 12 (2001), 14-20.

Komatsu, et al., Oolong tea increases energy metabolism in Japanese females, The Journal of Medical Investigation, vol. 50, 2003 170-175.

(Continued)

*Primary Examiner* — Amy L Clark

(74) *Attorney, Agent, or Firm* — Kramer & Amado P.C.

(57) ABSTRACT

A composition for promoting weight loss comprising black tea extract, white tea extract, oolong tea extract, guarana extract, green maté extract, thiamine, choline and N-acetyl-cysteine. The composition may be administered in methods for promoting weight loss by increasing fat oxidation and/or controlling appetite.

11 Claims, 2 Drawing Sheets

OTHER PUBLICATIONS

Tian, et al., Weight reduction by Chinese medicinal herbs may be related to inhibition of fatty acid synthase, Life Sciences 74 (2004), 2389-2399.
Harborne, et al., Advances in flavonoid research since 1992, Phytochemistry 55 (2000), 481-504.
Aucamp, et al., Simultaneous analysis of tea catechins, caffine, gallic acid, theanine and ascorbic acid by micellar electrokinetic.., J.of Chromatography, 876 (2000), 235-242.
Nonogaki, New Insights into sympathetic regulation of glucose and fat metabolism, Diabetologia (2000) 43: 533-549.
Borchardt, et al., Catechol 0-Methyltransferase.5. Structure-Activity Relationships for Inhibition by Flavonoids, Journal of Medicinal Chemistry, 1975, vol. 18 No. 1, 120-122.
Sanderson, et al., On the Formation of Black Tea Aroma, Journal of Agr. Food Chem., vol. 21, No. 4, 1973, 576-585.
Desai, et al., Analysis of derivatized and underivated thanine enantiomers by high-performance liquid.., Rapid Com. in Mass Spectrometry (2004); 18; 251-256.
Bukowski, et al., Human T Cells Recognize Alkylamines Derived from Microbes, Edible Plants, and Teas.., Immunity, vol. 11, 57-65, Jul. 1999 by Cell Press.
Landsberg, et al., Sympathoadrenal system and regulation of thermogenesis, Am J. Physiol Endocrinol Metab, 1984, vol. 247, Issue 2 181-E189, Abstract.
Jung, et al., Caffeine: its effect on catecholamines and metabolism in lean and obese humans, Clin Sci May 1981 60(5), 527-535, Abstract.
Lunder, et al., Tea History Botany & Genetics Processing, Nestle 1988, Nestle Ltd. Technical Assistance.
Dulloo, et al., Normal caffine consumption: influence on thermogenesis and daily energy expenditure in lean and postobese.., American J Clin. Nutr.: 1989: (49), 45-50.
Astrup, et al., Caffine: a double-blind, placebo-controlled study of its thermogenic, metabolic, and cardiovascular effects in.., American J Clin. Nutr.: 1990:(51) 759-767.
Graham, Green Tea Composition, Consumption, and Polyphenol Chemistry, Preventive Medicine 21, 334-350 (1992).
Kamath, et al., Antigens in tea-beverage prime human T cells in vitro and in vivo for memory and nonmemory antibacterial.., PNAS May 13, 2003 vol. 100 No. 10, 6009-6014.
Haslam, et al. Thoughts on thearubigins, Phytochemistry 64 (2003), 61-73.
Cannon, et al., Brown Adipose Tissue: Function and Physiological Significance, Physiol Rev 84: (2004), 277-359.
Sugiyama, et al. Teas and Other Beverates Suppress D-Galactosamine-Induced Liver Injury in Rats, J. Nutr. 129 (1999), 1361-1367.
Scharbert, et al., Molecular Definition of Black Tea Taste by Means of Quantitative Studies, Taste Reconstitution.., Journal of Arg. Food Chem. (2005), 53, 5377-5384.
Ekborg-Ott, et al. Varietal Differences in the Total and Enantiometic Composition of Theanine in Tea, J. Agric. Food Chem.,1997, 45, 353-363.
Bray, Food intake, sympathetic activity, and adrenal steroids, Brain Research Bulletin vol. 32, Issue 5, 1993, 537-541, Abstract.
Tappy, Metabolic effects of an increase of sympathetic activity in healthy humans. Int J Obes Relat Metab Disord. Jun. 1995; 19(6), 419-422, Abstract.

* cited by examiner

COMPOSITION AND METHOD FOR PROMOTING WEIGHT LOSS

BACKGROUND

Inability to properly manage weight is an increasing problem among the adult population as indicated by increasingly rising rates of obesity. Obesity and excessive weight lead to a litany of health problems such as cardiovascular disease, skeletal and joint disease, diabetes, cancer, poor body image, depression and overall decreased energy. However, maintaining proper body weight is difficult for individuals who lack the time to exercise or the knowledge and wherewithal to abide by a healthy diet.

The regulation of body weight involves a complex interaction of the central nervous system (CNS), endocrine system and digestive system. The food consumed from all dietary sources by an individual amounts to the total (caloric) energy intake. The extent of energy (food stores) utilized by the body tissues to perform work (to undertake all the functions of the body) is energy expenditure (EE). The cells utilize energy sources to generate heat, a process known as thermogenesis. All of the energy expended by the body is ultimately converted to heat. The food ingested and the body's metabolic energy stores in the forms of fat (excess calories stored as fat) and glycogen, combine with oxygen and undergo the process of oxidation to generate bioenergy (ATP) in the body cells, utilized for carrying out all life processes. These metabolic processes produce energy as heat (thermogenesis). When one consumes calories in excess of those required for immediate energy production, conversion of a portion of these excess calories to heat occurs, rather than its storage as fat, a process known as diet-induced thermogenesis. The two fundamental approaches to induce weight loss are either to decrease energy (food) intake or to increase energy expenditure by enhanced oxidation of food sources, or a combination of both.

The body possesses an expanded capacity to store fat. The fat stores in the body readily accommodate increasing levels of energy intake over and above those required for daily energy needs. The mobilization of stored fat from the body, in the form of triglycerides, and their hydrolysis to free fatty acids (lipolysis) provides substrates for metabolic oxidation. Raising metabolism, particularly that of fat, utilizes more food reserves and, therefore, results in higher EE. The preferential deployment of fat for enhanced oxidation accelerates the utilization of body fat, thereby depleting fat stores in the tissues and inducing weight loss. In case there is a deficit in the supply of energy, the body draws from fats stored from excess energy intake (from foods) and oxidizes the same (loss of weight).

The body's physiological systems maintain homeostasis with respect to energy (caloric) intake and energy utilization. The regulation of energy balance involves a complex network of hormonal and neural mechanisms. A net imbalance between energy intake and energy expenditure over time impairs body weight maintenance, resulting in weight gain leading to excessive body weight and eventually contributing to obesity, depending on the severity.

When the body encounters an energy deficit in the course of weight-reducing diets, it tends to save energy by reducing thermogenesis. This factor contributes to a failure in sustaining body weight after body weight loss. These circumstances require continually stimulated thermogenesis. After losing weight for a short duration, an individual's weight stabilizes. In order to maintain body weight there is a need to control food intake and stimulate thermogenesis on an ongoing basis.

Body weight control methods often yield short-term positive results and sustained weight maintenance is a real challenge. The difficult task is to identify substances, which are readily able to suppress appetite and reduce food (energy) intake, and continuously maintain increased metabolism and enhanced EE, thereby facilitating body weight maintenance effects in regulating food intake.

Prior art attempts at increasing energy expenditure and thermogenesis have primarily used large amounts of stimulants such as caffeine and ephedra. Caffeine in particular has been a popular CNS stimulant used in weight management. While caffeine at high doses increases energy expenditure and induces fat oxidation, continued or sustained weight loss becomes a major concern where greater amounts of caffeine lead to a gradual habituation and eventual decrease in efficacy. Furthermore, stimulants such as caffeine induce possible transient side effects on the cardiovascular system. Cardiovascular side effects are often a concern for those with unhealthy body weight where obesity and cardiovascular health problems often overlap. Caffeine in large amounts should also be avoided by people who suffer from kidney disease, an overactive thyroid, a tendency to spasms, or problems with anxiety or panic.

Accordingly, there is a need for providing a composition for promoting weight loss, through increased fat oxidation and modulation of appetite that contains decreased levels of caffeine. The composition should provide weight loss effects without the drawbacks of caffeine habituation leading to decreased efficacy over time and cardiovascular and CNS side effects caused by high amounts of caffeine. Furthermore, there is a need for methods for promoting weight loss by administering a composition that increases fat oxidation and modulates appetite with decreased levels of caffeine.

SUMMARY

In an embodiment, a composition comprises black tea extract, white tea extract, guarana extract, oolong tea extract, green maté extract, thiamine, choline and N-acetylcysteine. In another embodiment, a method for promoting weight loss by increasing fat oxidation and controlling appetite comprises administering a pharmaceutical composition comprising black tea extract, white tea extract, guarana extract, oolong tea extract, green maté extract, thiamine, choline and N-acetylcysteine. The combination of the elements of the pharmaceutical composition promotes weight loss while administering decreased amounts of caffeine as compared to conventional formulations.

BRIEF DESCRIPTION OF THE DRAWINGS

In order to better understand various exemplary embodiments, reference is made to the accompanying drawings, wherein.

DETAILED DESCRIPTION

Figure 1:
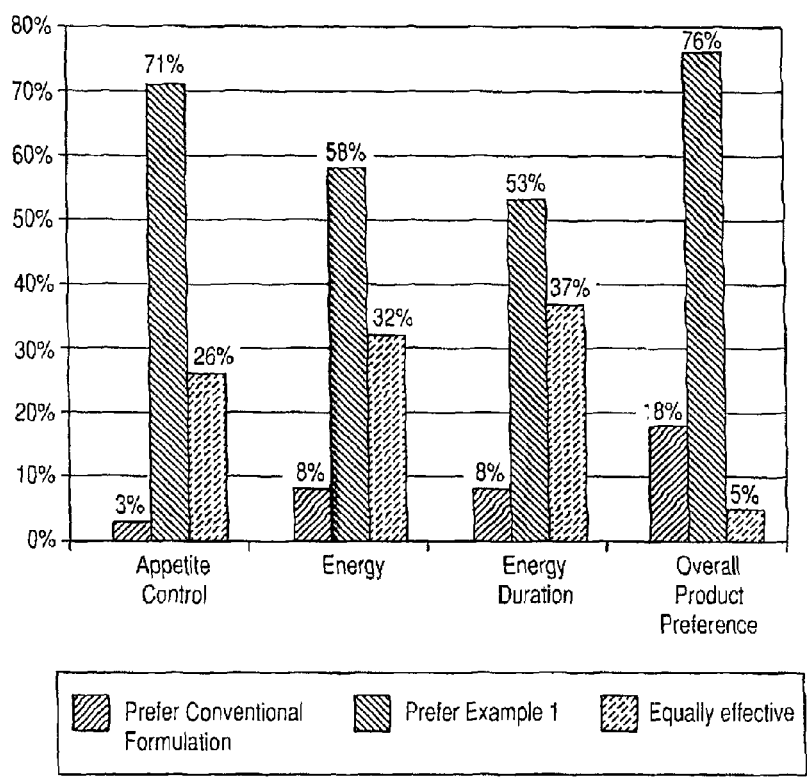
FIG. 1 and FIG. 2 each show results of a comparison between a formula disclosed herein and a conventional formula.

For simplicity and illustrative purposes, the principles are shown by way of examples of compositions and methods described. In the following description, numerous specific details are set forth in order to provide a thorough understanding of the examples. It will be apparent however, to one of ordinary skill in the art, that the examples may be practiced without limitation to these specific details. In other instances, well known methods and compositions are not described in detail so as not to unnecessarily obscure understanding of the examples.

An embodiment includes a composition for promoting weight loss. The composition promotes weight loss by increasing fat oxidation and controlling appetite while administering limited levels of caffeine. In an example, the composition comprises a combination of black tea extract, white tea extract, guarana extract, oolong tea extract, green maté extract, thiamine, choline and N-acetylcysteine. The combination of all of the elements provides for weight loss with decreased amounts of caffeine.

Black tea extracts are derived from natural tea produced from the leaves of *Camellia sinensis* from the genus *Theaceae*. In general there are three principal types of manufactured tea, namely green tea (unfermented), oolong (partially fermented) and black tea (fully fermented). The term "fermentation" refers to the oxidative transformations undergone by tea leaf phenolics, involving natural browning reactions inducing by polyphenol oxidases wlhin the cells of the tea plant. During the manufacture of black tea, a major proportion of the monomeric free catechins in the fresh green tea leaf undergoes oxidative changes culminating in the generation of a series of compounds, including bisflavanols, theaflavins, epitheaflavic acids, and thearubigins, which impart the characteristic taste and color properties of black tea.

According an embodiment, the black tea extract comprises polyphenols, theaflavins and caffeine. One of the polyphenols specific to the black tea extract, gallic acid, is known to have appetite suppressing qualities. The theaflavins found in black tea suppress NF-kappaB (nuclear factor-kappaB) and downregulate IkappaB kinase (IKK) activity, both of which are factors involved in obesity. Theaflavins also inhibit the activity of AP-1, a nuclear binding protein (transcription factor) relevant to obesity. Black tea extracts further confer a beneficial effect on the coronary circulation in human subjects and enhance vasodilation which leads to stimulation of metabolism and lipolysis.

Other constituents particular to black tea extracts include 8-epigallocatechin gallate ("EGCg") which is the oxidized form of the naturally occurring 6-EGCg. The unique constituents of black tea extract may further provide a synergistic benefit in cellular systems with increased fat oxidation through the constituents antioxidative properties. In particular, the black tea extracts containing 8-EGCg may provide protection of the cellular energy producing organelles that are exposed to oxidative stress due to increased fat oxidation and cellular energy production.

According an embodiment, the black tea extract may be standardized to comprise not less than about 40% polyphenols. According to alternative embodiments, the black tea extract may standardized to comprise not less than about 20% theaflavins and/or the black tea extract may be standardized to comprise not less than about 10% caffeine. In an example, the black tea extract may be standardized to comprise not less than about 40% polyphenols, not less than about 20% theaflavins and not less than about 10% caffeine.

White tea, derived from young and tender tea shoots, is the least processed of all teas. Since white tea is not fermented, its catechins are the least modified as compared to green, oolong and black teas. The polyphenols of white tea are even more native than those of green tea. Therefore, white tea extracts contain qualitatively different catechins, in particular (−)-epigallocatechin gallate (EGCg), than those of green tea extracts. EGCg has been implicated in the inhibition of the enzyme catechol-O-methyl-transferase. This enzyme inactivates norepinephrine. According to an embodiment, the white tea extract may be standardized to comprise not less than about 80% polyphenols. According to an alternative embodiment, the white tea extract may be standardized to comprise not less than about 30% EGCg. In another example, the white tea extract may be standardized to comprise not less than about 80% polyphenols, not less than about 30% EGCG and not less than about 5% caffeine.

Oolong tea extracts are derived from oolong tea, which is a partially fermented product having components common to both green and black teas including both native and partially oxidized constituents. In particular, several catechins characteristic of green tea, are present in oolong tea, along with catechin oligomers, oligomeric proanthocyanidins and polymeric polyphenolics, typically characteristic of black tea. Specific constituents of oolong tea include dimeric proanthocyanidins, theasinensins D-G, oolongtheanin, 8-C-ascorbyl-(−)-epigallocatechin-3-O-gallate and novel dimeric flavan-3-ols, oolonghomobisflavans A and B. As compared to green tea, oolong tea has been show to increase energy expenditure at much higher levels due to the polymerized polyphenols that are not present in green tea.

Oolong tea constituents also appear to promote hormone sensitive lipase activity in adipose tissues resulting in lipolysis and have the ability to influence the sympathoadrenal system and the turn over of catecholamines such as epinephrine and norepinephrine. The modulation of catecholamine turn over influences circulating and neuronal catecholamines, which increase metabolic rate and fat oxidation. According to an embodiment, oolong tea extract may be standardized to comprise not less than about 40% polyphenols.

Guarana extract is derived from the seed of *Paullina cupana*, a tropical plant found in the Amazon basin. The seeds of *Paullina cupana* are peeled, dried, roasted, ground much like coffee beans. Guarana extracts provide concentrated amounts of caffeine in addition to theobromine and theophylline. Caffeine related compounds derived from guarana extract are often also known as guararine.

In addition to acting as a stimulant on the basis of caffeine content, guarana has been shown to increase adipocyte cAMP levels by inhibiting phosphodiesterase. Other effects include acting as an antagonist to adenosine receptor (thereby maintaining AMP levels) and stimulating calcium release which is relevant to adipocyte lipolysis. According to an embodiment, the amounts of guarana extract in the composition are limited to decrease total caffeine. In an example, guarana extract may be standardized to comprise not less than about 50% caffeine.

Green maté is derived from the leaf of *Ilex paraguariensis*, which is an evergreen plant found in South America. The maté leaves can be dried to prepare green maté and then brewed and further processed to prepare yerba maté. Therefore, the polyphenols in green maté extracts are unmodified and intact as compared to yerba maté. In addition to containing unique polyphenols, green maté is also a natural source of caffeine which has known stimulant and thermogenic properties. According to an embodiment, green maté extract may be standardized to comprise not less than about 30% caffeine. According to an alternative embodiment, the green maté extract may be standardized to comprise not less than about 30% polyphenols. In an example of the composition, the green maté may be standardized to comprise not less than about 30% caffeine and not less than about 30% polyphenols.

Thiamine, also known as vitamin $B_1$, is a water-soluble vitamin having a structure that consists of a substituted pyrimidine ring joined by a methylene bridge to a substituted thiazole ring. Studies have shown that the active form of thiamine plays an essential role as a cofactor in key reactions in carbohydrate metabolism and thermogensis generally. It is also involved in the metabolism of branched-chain amino acids and may have non-coenzyme (non-cofactor) roles in excitable cells. According to an embodiment, thiamine is in the form of thiamine hydrochloride ("thiamine HCl"). In an example, thiamine HCl may be assayed at purity of 98.5% or above.

Choline, also known as 2-hydroxy-N,N,N-trimethylethanamine, is an essential nutrient that is widely distributed in foods. The three major metabolic functions of choline are as a precursor for phosphatidylcholine biosynthesis, as a precursor for acetylcholine biosynthesis and as a methyl donor. With regards to weight loss, choline functions as a lipotropic agent that is necessary to remove lipids from the liver and utilize the lipids as energy. Studies have also shown that choline possesses anti-obesity effects. Choline is often supplemented in the form of choline chloride or choline bitartrate. According to an embodiment, choline is in the form of choline bitartrate. Choline bitartrate may be assayed at not less than about 87% purity containing not less than about 43% choline.

N-Acetylcysteine is the N-acetyl derivative of the amino acid L-cysteine. Supplementation with N-acetylcysteine has been shown in studies to inhibit alloxan-induced NFB activation and reduce hyperglycemia. N-Acetylcysteine further acts as a hepatoprotectant due to its ability to serve as a precursor of glutathione. A major role of glutathione is the maintenance of a normal redox state of the liver and other tissues. As a precursor of glutathione, N-acetylcysteine also protects the cell membranes from lipid peroxidation which can result from increased oxidative stress caused by fat oxidation. According to an embodiment, N-acetylcysteine may be assayed at not less than about 98% pure.

The term "standardized" as used in the field of naturally derived nutritional products refers to the process for delivering a product with a specific minimum level of one or more plant constituents. Standardization represents the level of concentration of particularly desired elements from a plant source. Methods for standardizing plant substances, including black tea, white tea, oolong tea, guarana and green maté, are well known in the art. Furthermore, the measurement of particular plant constituents on which standardization is based is also well known in the art.

The term "about" when used as a modifier of a numerical range or amount designates an approximation of the range or the amount whereby minor deviations from the range or amount are within the scope of the invention. Such deviations are known in the art of manufacturing formulations having a number of different ingredients of varying weight and consistency.

According to an embodiment, a composition comprises black tea extract that is standardized to comprise not less than about 40% polyphenols, not less than about 20% theaflavins and not less than about 10% caffeine; white tea extract that is standardized to comprise not less than about 80% polyphenols; oolong tea extract that is standardized to comprise not less than about 40% polyphenols; guarana seed extract that is standardized to comprise not less than about 50% caffeine; and green maté extract that is standardized to comprise not less than about 30% caffeine and not less than about 30% polyphenols.

An example may include a composition that comprises a weight ratio of theaflavins to polyphenols in the black tea extract in the range of about 0.3:1 to about 1:1. In an alternative example the composition may contain a weight ratio of theaflavins in the black tea extract to polyphenols in the green maté extract in the range of about 0.5:1 to about 1.5:1.

In an embodiment, the composition may be administered to a human on the basis of a serving size. A serving size designates a fixed amount of the composition, whereby multiple servings or fractions of servings may be administered to provide weight loss through increased fat oxidation and/or appetite control.

According to an embodiment, the composition comprises thiamine in the amount of about 0.2-12 mg per serving, black tea extract in the amount of about 20-1,000 mg per serving, white tea extract in the amount of about 20-1,000 mg per serving, guarana extract in the amount of about 50-600 mg per serving, oolong tea extract in the amount of about 20-1,000 mg per serving, green maté extract in the amount of about 10-1,000 mg per serving, choline in the amount of about 1-100 mg per serving and N-acetylcysteine in the amount of about 1-300 mg per serving.

According to an alternative embodiment, the composition comprises thiamine in the amount of about 1-3 mg per serving, black tea extract in the amount of about 40-120 mg per serving, white tea extract in the amount of about 50-150 mg per serving, guarana extract in the amount of about 60-180 mg per serving, oolong tea extract in the amount of about 40-120 mg per serving, green maté extract in the amount of about 30-90 mg per serving, choline in the amount of about 5-15 mg per serving; and N-acetylcysteine in the amount of about 1-4 mg per serving.

According to an alternative embodiment of the invention, the composition may comprise a ratio of weight of black tea extract to weight of white tea extract in a range from about 2.5:1 to about 1:3.75. Another alternative embodiment may be composition comprising a ratio of weight of black tea extract to green maté extract in range from about 4:1 to about 1:2.2.5. Another alternative embodiment includes a composition comprising a ratio of weight of white tea extract to green maté extract in a range from about 5:1 to about 1:1.8. In an example the ratio of the sum of the weight of black tea extract and weight of white tea extract to the weight of green maté extract is in a range from about 9:1 to about 1:1.

A serving size of the composition provides the proper amounts of constituents to provide weight loss effect while delivering a decreased amount of caffeine as opposed to conventional formulations. According to an embodiment, a serving size comprises less than or equal to about 200 mg of caffeine, more preferably less than or equal to about 100 mg of caffeine.

The composition may contain further constituents including, but not limited to rooibos tea extract, grape pomace extract, yerba maté extract, bilberry extract, grape juice extract, apple extract, artichoke extract, green coffee extract, cinnamon bark extract, chlorogenic acid, vitamin C, quercetin-3-rhamnoside (quercetrin) and quercetrin-3-glycoside (isoquercetrin), calcium or inositol and combinations thereof.

According to an embodiment, a composition comprises thiamine in the amount of about 1-3 mg per serving, black tea extract in the amount of about 40-120 mg per serving, white tea extract in the amount of about 50-150 mg per serving, guarana extract in the amount of about 60-180 mg per serving, oolong tea extract in the amount of about 40-120 mg per serving, green maté extract in the amount of about 30-90 mg per serving, choline in the amount of about 5-15 mg per serving; and N-acetylcysteine in the amount of about 1-4 mg per serving and one or more of the following ingredients: polyphenol standardized rooibos tea extract in the amount of about 10-200 mg, polyphenol standardized yerba maté extract in the amount of about 50-200 mg, polyphenol standardized grape pomace extract in the amount of about 10-200 mg, anthocyanidin and polyphenol standardized bilberry extract in the amount of about 50-200 mg, anthocyanidin and polyphenol standardized rubired grape juice extract in the amount of about 50-200 mg, polyphenol standardized apple extract in the amount of about 50-200 mg, polyphenol and cynarin standardized artichoke extract in the amount of about 50-200 mg, chlorogenic acid and polyphenol standardized green coffee extract in the amount of about 30-200 mg, standardized cinnamon extract in the amount of about 50-250 mg, vitamin C in the amount of about 40-120 mg, quercitrin in the amount of about 60-180 mg, inositol in the amount of about 20-50 mg and calcium in the amount of about 100-300 mg.

A composition may further include a number of non-active compounds, such as diluents, buffers, preservatives, desiccants, thickeners, fillers, flavorings, sweeteners, colorings, effervescents and any other excipients or non-active ingredients known in the art. The composition may be administered as a number of dosage forms, including, but not limited to powders, liquids, suspensions, capsules, tablets or chewing gums and/or may be formed as part of a food product. The composition may be in the form of a tablet or capsule for oral administration.

An alternative embodiment includes a method for increasing fat oxidation by administering a composition comprising black tea extract, white tea extract, guarana extract, oolong tea extract, green maté extract, thiamine, choline and N-acetylcysteine. In an example, the composition may be administered in an oral dosage form twice a day, each oral dosage form containing one serving size of the composition. According to an alternative embodiment, the composition may be administered in one serving thirty minutes before breakfast and in a second serving thirty minutes before lunch.

According an embodiment, a method for administering the composition increases fat oxidation through affecting the sympathoadrenal system. In particular, the combination of polyphenols (from white tea extract, oolong tea extract, black tea extract and green maté extract), theaflavins (from black tea extract), and caffeine (from black tea extract, green maté extract, and guarana extract) of the composition has the ability to influence the sympathoadrenal system and the turn over of catecholamines such as epinephrine and norepinephrine.

Catechin compounds, such as polyphenols and theaflavins derived from tea extracts, have been shown to elevate endogenous levels of catecholamines. The modulation of catecholamine turn over influences circulating and neuronal catecholamines, which increase metabolic rate and fat oxidation. The maintenance of levels of the intracellular signaling molecule, cyclic AMP (cAMP), in the sympathetically innervated cells (such as cells of the adipose tissue, repository of fat storage) is critical for increase metabolism and enhancing energy expenditure by metabolism fats. Catecholamine stimulation of the sympathetic nervous system has been shown to increase plasma norepinephrine levels by 27% and fat oxidation by 72%.

An embodiment also includes a method for controlling appetite in humans. In an example, a composition comprising black tea extract, white tea extract, guarana extract, oolong tea extract, green maté extract, thiamine, choline and N-acetylcysteine is administered in an oral dosage form to humans to control appetite. An oral dosage form may contain a single serving and may be administered twice a day. In an alternative embodiment, an oral dosage form containing one serving of the composition may be administered once thirty minutes before breakfast and then again thirty minutes before lunch. Controlling appetite means both decreasing appetite and maintaining appetite at a constant level.

According an embodiment, administration of a combination of constituents results in decreased appetite. When taken together, gallic acid (black tea polyphenols), EGCG (white tea polyphenols) and oolong tea polyphenols synergistically diminish food consumption. Additionally, the combination of tea polyphenols and methylxanthanas and green maté polyphenols and methylxanthans results in the modulation of gamma-aminobutyric acid ("GABA") receptors and benzodiazepine binding sites which regulate appetite and food intake. GABA (gamma-aminobutyric acid, the major inhibitory neurotransmitter in the brain), receptors and benzodiazepine binding sites in these receptors modulate appetite and food intake. GABA plays an important role in controlling energy balance within the central nervous system and food intake. The complex interactions between several neurotransmitters such as GABA, dopamine, serotonin, neuropeptide Y, leptin, acetylcholine, melanin-concentrating hormone, ghrelin, nitric oxide, and cytokines and insulin and insulin receptors in the brain ultimately determine and regulate food intake. The composition affects appetite through modulation of GABA-benzodiazepine receptor sites.

Additionally, catechins inhibit many aspects of the cascades after cerebral ischemia, which involves NMDA receptor activation. NMDA receptors contribute to some forms of natural feeding and body weight regulation. The mixture of catechins in the composition may impair food intake by this action.

Example

The following table is an example of an embodiment in a single serving size:

| INGREDIENTS | AMOUNT PER SERVING |
| --- | --- |
| Thiamine (as hydrochloride) | 1.5 mg |
| Black tea extract (leaf-*Camellia sinensis*) | 80 mg |
| White tea extract (leaf-*Camellia sinensis*) | 100 mg |
| Oolong tea extract (leaf-*Camellia sinensis*) | 80 mg |
| Guarana extract (seed-*Paullinia cupana*) | 120 mg |
| Green mateé extract (leaf-*Llex paraguariensis*) | 60 mg |
| Choline (as choline bitartrate) | 10 mg |
| N-Acetylcysteine | 2.5 mg |

The formulation of Example 1 was used in a comparison study to determine its effectiveness versus a conventional weight-loss formulation characterized by high levels of caffeine versus polyphenols. The conventional formulation is described below:

Conventional Weight-Loss Formulation

| INGREDIENTS | AMOUNT PER SERVING |
| --- | --- |
| Vitamin A (as beta-carotene) | 1,000 IU |
| Niacin | 20 mg |
| Magnesium (as magnesium phosphate) | 25 mg |
| Potassium (as potassium phosphate) | 50 mg |
| Bitter orange extract (pericarp-*Citrus aurantium*) | 500 mg |
| Guarana extract (seed-*Paullinia cupana*) | 200 mg |
| Green tea extract (leaf-*Camellia sinensis*) | 10 mg |

The conventional weight-loss formulation is generally administered as part of a more extensive nutritional supplement and multivitamin regimen. Therefore, Example 1 was also administered with the multivitamin and nutritional supplement regimen to obtain an accurate comparison with the conventional formulation. While Example 1 was used in combination with additional nutritional supplements, an embodiment includes administering the composition alone or in combination with other nutritional supplements.

The additional nutritional supplements administered in combination with Example 1 and the conventional weight-loss formulation, for the purposes of comparison testing, are described below. The supplements include a Multiple Vitamin and Mineral Supplement, an Omega-3 Fatty Acid Supplement, a Multinutrient Supplement, a Probiotic Dietary Supplement and a Citrus Dietary Supplement.

Multiple Vitamin and Mineral Supplement

| INGREDIENTS | AMOUNT PER SERVING |
| --- | --- |
| Vitamin A (as palmitate) | 2,500 IU |
| Vitamin A (as beta-carotene) | 12,500 IU |
| Vitamin C (as ascorbic acid) | 600 mg |
| Vitamin D (as cholecalciferol) | 400 UI |
| Vitamin E (as d-alpha tocopheryl succinate) | 150 UI |
| Thiamine (as thiamine HCl) | 4.5 mg |
| Riboflavin | 5.1 mg |
| Niacin (as niacinamide/niacin) | 60 mg |
| Vitamin B-6 (pyridoxine HCl) | 6 mg |
| Folic Acid | 800 mcg |
| Vitamin B-12 (as cyanocobalamin) | 36 mcg |
| Biotin | 300 mcg |
| Pantothenic acid | 30 mg |
| Calcium (as amino acid chelate) | 150 mg |
| Phosphorus (as amino acid chelate) | 25 mg |
| Iodine (from kelp) | 150 mcg |
| Magnesium (as amino acid chelate) | 175 mg |
| Zinc (as zinc monomethionine) | 15 mg |
| Selenium (L-selenomethionine) | 80 mcg |
| Copper (as amino acid chelate) | 2 mg |
| Manganese (as amino acid chelate) | 4 mg |
| Chromium (as chromium citrate) | 100 mcg |
| Molybdenum (as amino acid chelate) | 50 mcg |
| Potassium (as potassium chloride and amino acid chelate) | 100 mg |
| Inositol | 6 mg |
| Choline (as bitartrate) | 60 mg |
| Boron (as amino acid chelate) | 300 mcg |
| Vanadium (as bis-maltolato-oxovanadium) | 50 mcg |
| Silicon (as amino acid chelate) | 500 mcg |
| Coenzyme Q-10 | 150 mg |
| Octacosanol | 2 mg |
| Ribonucleic acid (RNA) | 2 mg |
| Garlic powder, odorless (bulb-*Allium sativum*) | 50 mg |
| L-Glutathione | 5 mg |
| Citrus flavonoids | 100 mg |
| Grape extract (seed-*Vitis vinifera*) | 5 mg |
| Milk thistle extract (seed-*Silybum marianum*) | 5 mg |
| Ginkgo extract (leaf-*Ginkgo biloba*) | 10 mg |

Omega-3 Fatty Acid Supplement

| INGREDIENTS | AMOUNT PER SERVING |
| --- | --- |
| Vitamin E (as d-alpha tocopheryl acetate) | 3 IU |
| Eicosapentaenoic Acid (from marine lipids) | 300 mg |
| Docosahexaenoic Acid (from marine lipids) | 200 mg |

Multinutrient Supplement

| INGREDIENTS | AMOUNT PER SERVING |
| --- | --- |
| Vitamin C (as magnesium/sodium/potassium ascorbates) | 300 mg |
| Vitamin B-6 (as pyridoxine HCl) | 2 mg |
| Iodine (as potassium iodide) | 25 mcg |
| Magnesium (as magnesium ascorbate) | 10 mg |
| Zinc (as zinc monomethionine) | 1 mg |
| Chromium (as citrate) | 50 mcg |
| Garcinia extract (fruit-*Garcinia cambogia*) | 1,000 mg |
| Oolong tea extract (leaf-*Camellia sinensis*) | 100 mg |
| Guarana extract (seed-*Paullinia cupana*) | 75 mg |
| Eleuthero extract (root-*Eleutherococcus senticosus*) | 25 mg |
| Tulsi extract (leaf-*Ocimum sanctum*) | 25 mg |
| Taurine | 25 mg |
| Beta-sitosterol | 12.5 mg |
| L-Carnitine (as tartrate) | 12.5 mg |
| Gymnema extract (leaf-*Gymnema sylvestre*) | 5 mg |
| Vanadium (as bis-maltolato-oxovanadium) | 100 mcg |

Probiotic Supplement

| INGREDIENTS | AMOUNT PER SERVING |
| --- | --- |
| Vitamin A (as beta-carotene) | 1,000 IU |
| Zinc (as zinc monomethionine) | 500 mcg |
| *Lactobacillus acidophilus* | 0.5 Billion |
| *Bifidobacterium bifidum* | 0.5 Billion |
| Fructooligosaccharides | 250 mg |
| Moomiyo | 25 mg |
| Artichoke extract (leaf-*Cynara scolymus*) | 250 mg |

Citrus Dietary Supplement

| INGREDIENTS | AMOUNT PER SERVING |
| --- | --- |
| D-Limonene | 60 mg |
| Grapefruit juice powder | 200 mg |
| 5-Hydroxytryptophan (seed-*Griffonia simplicifolia*) | 25 mg |

The comparison testing was performed in two cohorts. In the first study, a total of 38 participants who were previously taking the conventional weight-loss formulation were administered Example 1. Example 1 replaced the conventional formulation in the nutritional supplement regimen. A serving of Example 1 was administered 30 minutes before breakfast and again 30 minutes before lunch. The remaining supplement formulations were administered with a meal, preferably breakfast, except for the probiotic supplement and multinutrient supplement which were administered at the same time as Example 1.

Of the total number of participants in the first study, the mean weight loss was 4.6 pounds over the course of 14 days. The results of the study are shown as in FIG. 1 as Graph 1. 71% of the participants rated Example 1 most effective for appetite control. 58% of the participants rated Example 1 to be more effective for increasing energy and 32% rated Example 1 to be equally effective as compared to the conventional weight-loss formulation. 53% of the participants rated Example 1 to be more effective in providing a longer duration of increased energy over the conventional weight-loss formulation with 37% rating the products equally effective. Overall, 76% of the participants preferred Example 1 over the conventional formulation.

A second study was performed with 63 participants following the same protocol. The conventional weight-loss formulation was replaced with Example 1 which was administered according the same nutritional supplement regimen.

Figure 2:
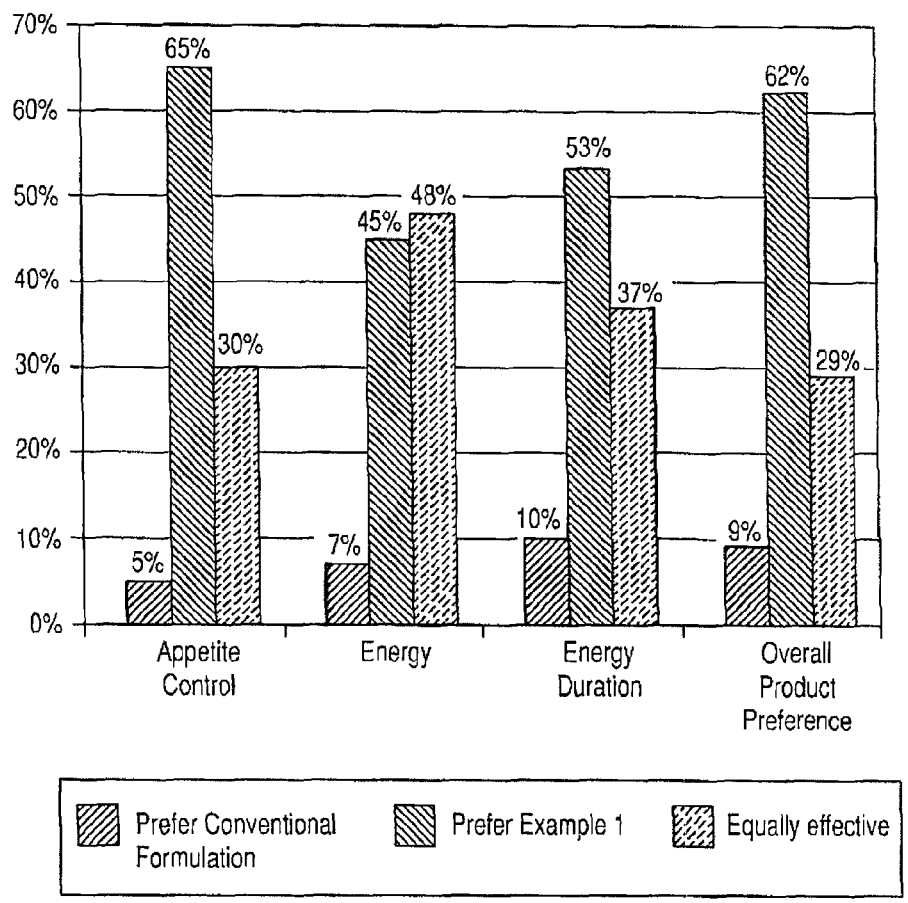

The results of the second study are described in FIG. 2 as Graph 2. Of the total number of participants, the mean weight loss was 2.5 pounds. Of the participants who lost weight, the mean weight loss was 4.5 pounds. As seen in Graph 2, 65% of the participants rated Example 1 to be more effective for appetite control. 45% of the participants rated Example 1 to be more effective for increasing energy and 48% rated Example 1 to be equally effective as compared to the conventional weight-loss formulation. 53% of the participants rated Example 1 to be more effective in providing a longer duration of increased energy over the conventional weight-loss formulation with 37% finding the products to be equally effective with regards to duration of energy. Overall, 62% of the participants preferred Example 1 over the conventional formulation.

The findings of the study show that the participants found Example 1 to be more or equally effective in controlling appetite and increasing energy as compared to the conventional weight-loss formulation. The findings are surprising when considering the fact that Example 1 contained a significantly reduced amount of caffeine as compared to the conventional formulation, contrary to conventional thinking in the art. Thereby, Example 1 showed superior or at least equivalent efficacy with decreased amounts of stimulant and therefore decreased risk of habituation and side effects. According to an embodiment, the composition may be administered as a stand-alone product either before meals or at any other time during the day.

Although the present invention has been described in detail with particular reference to preferred embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed is:

1. A composition for promoting weight loss consisting essentially of:
    an effective amount of black tea leaf extract, wherein said black tea leaf extract is standardized to comprise not less than about 40% polyphenols, not less than about 20% theaflavins and not less than about 10% caffeine;
    an effective amount of white tea leaf extract, wherein said white tea leaf extract is standardized to comprise not less than about 80% polyphenols, not less than about 30% EGCG and not less than about 5% caffeine;
    an effective amount of oolong tea leaf extract, wherein said oolong tea leaf extract is standardized to comprise not less than about 40% polyphenols;
    an effective amount of guarana seed extract, wherein said guarana seed extract is standardized to comprise not less than about 50% caffeine; and
    an effective amount of green maté leaf extract, wherein said green maté leaf extract is standardized to comprise not less than about 30% caffeine and not less than about 30% polyphenols;
    an effective amount of thiamine;
    an effective amount of choline; and
    an effective amount of N-acetylcysteine.

2. The composition of claim 1, wherein the ratio of theaflavins to polyphenols in the black tea leaf extract is in a range from about 0.3:1 to about 1:1.

3. The composition of claim 1, wherein the ratio of theaflavins in the black tea leaf extract to polyphenols in the green maté leaf extract is in the range from about 0.5:1 to about 1.5:1.

4. The composition of claim 1, wherein said black tea leaf extract is present in an amount of about 20-1,000 mg; said white tea leaf extract is present in an amount of about 20-1,000 mg; said oolong tea extract is present in an amount of about 20-1,000 mg; said guarana leaf extract is present in an amount of about 50-600 mg; said green maté leaf extract in an amount of about 10-1,000 mg; said thiamine is present in an amount of about of about 0.2-12 mg; said choline is present in an amount of about 1-100 mg; and said N-acetylcysteine is present in an amount of about 1-300 mg.

5. The composition of claim 1, wherein said black tea leaf extract is present in an amount of about 40-120 mg; said white tea leaf extract is present in an amount of about 50-150 mg; said oolong tea extract is present in an amount of about 40-120 mg; said guarana leaf extract is present in an amount of about 60-180 mg; said green maté leaf extract in an amount of about 30-90 mg; said thiamine is present in an amount of about of about 1-3 mg; said choline is present in an amount of about 5-15 mg; and said N-acetylcysteine is present in an amount of about 1-4 mg.

6. The composition of claim 4, wherein the weight ratio of the black tea leaf extract to the white tea leaf extract is in the range of from about 2.5:1 to about 1:3.75.

7. The composition of claim 4, wherein the weight ratio of the black tea leaf extract to the green maté leaf extract is in the range of from about 4:1 to about 1:2.25.

8. The composition of claim 4, wherein the weight ratio of the white tea leaf extract to the green maté leaf extract is in the range of from about 5:1 to about 1:1.8.

9. The composition of claim 4, wherein the ratio of the sum of the weight of the black tea extract and the weight of the white tea leaf extract to the weight of the green maté extract is in the range of from about 9:1 to about 1:1.

10. The composition of claim 1, wherein the total amount of caffeine in the composition is present in an amount of about 1-200 mg.

11. The composition of claim 10, wherein the total amount of caffeine in the composition is present in an amount of about 1-100 mg.

* * * * *